United States Patent [19]

Toyoda et al.

[11] Patent Number: 4,658,301
[45] Date of Patent: Apr. 14, 1987

[54] PHOTOTELEGRAPHIC APPARATUS FOR TRANSMITTING IMAGES OF FILM AND DATA

[75] Inventors: Kenji Toyoda, Chigasaki; Makoto Kimura; Masaki Isogai, both of Tokyo, all of Japan

[73] Assignees: Kyodo News Service; Nippon Kogaku K.K., both of Tokyo, Japan

[21] Appl. No.: 841,017

[22] Filed: Mar. 17, 1986

Related U.S. Application Data

[63] Continuation of Ser. No. 614,683, May 29, 1984, abandoned.

[30] Foreign Application Priority Data

Jun. 3, 1983 [JP] Japan .................................. 58-98079

[51] Int. Cl.$^4$ ............................................... H04N 1/04
[52] U.S. Cl. ..................................... 379/100; 358/285;
358/85; 358/293
[58] Field of Search ................ 358/285, 293, 294, 85,
358/134, 256; 179/2 DP, 2 R

[56] References Cited

U.S. PATENT DOCUMENTS

| | | | |
|---|---|---|---|
| 3,719,773 | 3/1973 | Dougherty | 358/256 |
| 3,814,848 | 6/1974 | Kyte | 358/294 |
| 3,845,242 | 10/1974 | Richeson et al. | 179/2 R |
| 4,012,586 | 3/1977 | Roos | 358/285 |
| 4,150,873 | 4/1979 | Dali | 358/294 |
| 4,160,280 | 7/1979 | Atoji et al. | 358/294 |
| 4,306,252 | 12/1981 | Fearnside | 358/293 |
| 4,485,400 | 11/1984 | Lemelson et al. | 358/85 |
| 4,502,080 | 2/1985 | Tsuda | 358/294 |
| 4,503,468 | 3/1985 | Serinken et al. | 358/256 |

Primary Examiner—James J. Groody
Assistant Examiner—John K. Peng
Attorney, Agent, or Firm—Shapiro and Shapiro

[57] ABSTRACT

An apparatus for electrically transmitting the image of a pattern corresponding to the light transmission characteristic of a light-transmitting film substrate employs a linear image sensor for scanning the image of the pattern and producing a corresponding output signal, the frequency band of which is adjusted for transmission over a telephone circuit. The output signal can be made independent of magnification changes of the image-forming optical system, and the area of the pattern scanned by the linear image sensor can be set selectively. A second optical system is employed for observation and includes a retractable mirror that starts the production of the output signal when the mirror is retracted. Both a film image and data on an accompanying document can be transmitted.

25 Claims, 16 Drawing Figures

PHOTOTELEGRAPHIC APPARATUS FOR TRANSMITTING IMAGES OF FILM AND DATA

This is a continuation application of Ser. No. 614,683 filed May 29, 1984, now abandoned.

BACKGROUND OF THE INVENTION

1. Field of the Invention

This invention relates to a phototelegraphic transmitter for converting image information of a photograph into an electrical signal and transmitting it to a communication circuit, for example, a telephone circuit.

2. Description of the Prior Art

Heretofore, apparatus of this type has been such that a print obtained by developing a photograph and enlarging it on printing paper is set as an original in a transmitter and it is scanned and transmitted. In this case, two processes, i.e., development of a negative film and preparation of a print original by enlargement trimming, have been required from photographing to transmission, and this has required much labor and time. Particularly, the labor required for carrying and installing equipment parts for a simple dark room near the scene of photographing and the time required for enlargement in an urgent case have been great disadvantages of this system.

SUMMARY OF THE INVENTION

It is an object of the present invention to provide a phototelegraphic apparatus which eliminates the work of preparing enlarged prints and greatly reduces the above-mentioned labor and time by providing a phototelegraphic transmitter which converts an image directly from the negative or transparency of a photograph into an electrical signal and transmits it to a communication circuit.

It is another object of the present invention to provide a phototelegraphic apparatus which can transmit even hand-written characters in addition to negatives or positives.

The apparatus of the present invention is provided with a holding device for holding a film subjected to a developing treatment, an illuminating device for illuminating the film, an imaging optical system for making the real image of the image on the film, a one-dimensional image sensor disposed on the focal plane of the imaging optical system and movable in the focal plane, and an electronic circuit for electrically transmitting the output signal of the one-dimensional image sensor through a communication circuit.

In a preferred embodiment, the apparatus of the present invention is further provided with another one-dimensional sensor for electrically transmitting characters in addition to the image of the film.

In a further preferred embodiment, the electronic circuit of the apparatus of the present invention includes means for converting the negative and positive of the held film, and means for varying the γ value of the image sensor.

Also, the electronic circuit of the present invention includes means for electrically transmitting the output signal from the image sensor at a speed lower than the reading-out of such output signal.

In still a further preferred embodiment, the apparatus of the present invention is provided with an optical system for observing a predetermined area of the image of the focal plane of the imaging optical system, and the imaging optical system is provided with means for varying the magnification of the image.

The invention will become more fully apparent from the following detailed description thereof taken in conjunction with the accompanying drawings.

DESCRIPTION OF THE PREFERRED EMBODIMENTS

Figure 1:
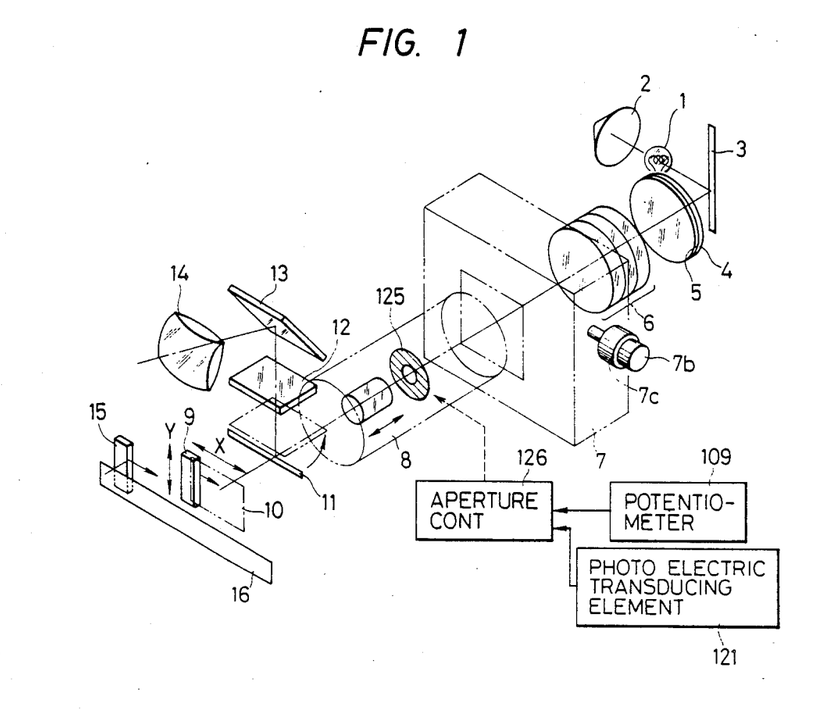
FIG. 1 shows the construction of the essential portions of the optical system of an embodiment of the present invention.

An embodiment of the present invention will hereinafter be described by reference to the drawings. FIG. 1 shows the essential portions of the optical system of the apparatus according to the present invention.

Members 1–6 are an illuminating optical system for illuminating the negative, and the light beam from the light source 1 is reflected by the reflecting mirror 2 and the infrared light thereof is transmitted through the dichroic mirror 3. The visible light is reflected by the dichroic mirror 3 and passes through the infrared light absorbing filter 4, and is diffused by the diffusing plate 5 and is condensed by the condenser lens 6 and enters a negative holding device 7. Subsequently, the illuminated negative is imaged as the image 10 of the negative on the focal plane by an imaging optical system 8. The imaging optical system 8 includes a stop 125 adjusted by an aperture controller 126.

If the length of a one-dimensional image sensor 9 is y and the amount of movement thereof perpendicular to the lengthwise direction thereof is x, the size of the image 10 is determined by x×y.

The imaging optical system 8 is a variable magnification lens system and can vary its imaging magnification by being moved along the direction of the optic axis.

Members 11–14 together constitute an observation optical system, and the movable mirror 11 is movable to an observation position and a retracted position. The light reflected by the mirror 11 is imaged on the screen 12 disposed at a position optically equivalent to the focal plane on which the image 10 is positioned. This imaged picture plane may be observed through the mirror 13 and the magnifier 14. The aperture controller 126 controls the aperture on the basis of the outputs from a potentiometer 109 shown in FIG. 6A and a photoelectric transducing element 121 shown in FIG. 8.

A second one-dimensional image sensor 15 is for reading the image and simultaneously therewith, reading a descriptive original 16 for transmitting the characters of the description or the like of the image.

Figure 2:
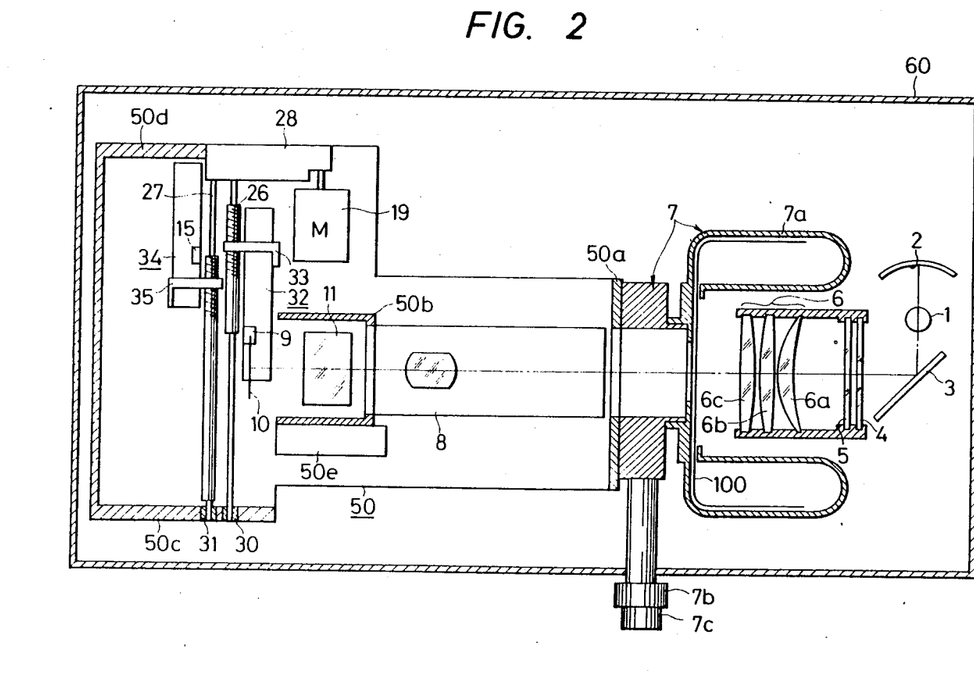
FIG. 2 is a transverse cross-sectional view showing the plan arrangement of the embodiment.
Figure 3A:
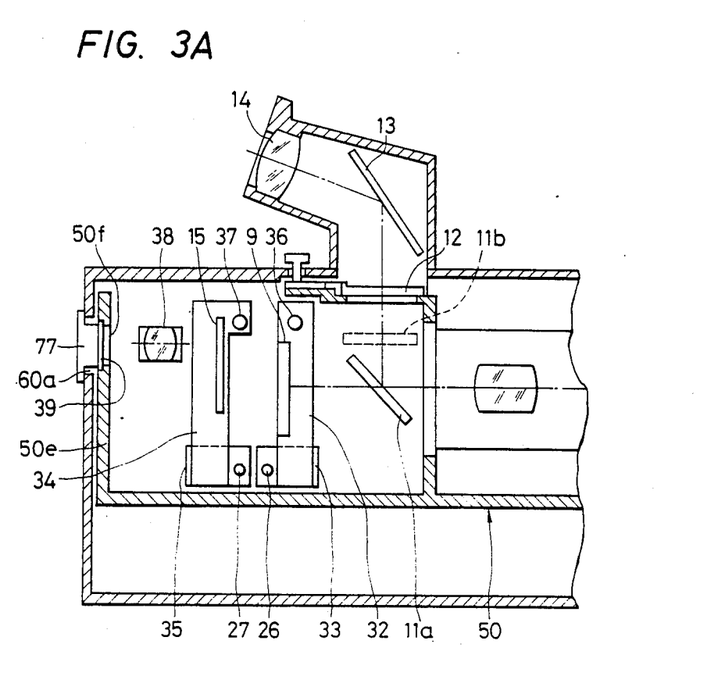
FIG. 3A is a vertical cross-sectional view showing the elevation of the embodiment.
Figure 3B:
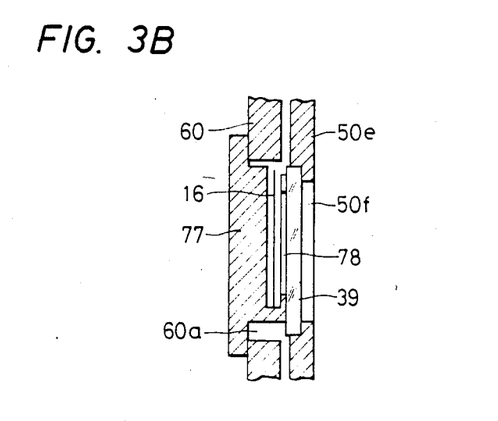
FIG. 3B is a fragmentary enlarged cross-sectional view of FIG. 3A.

FIGS. 2 and 3A are a transverse cross-sectional view and a vertical cross-sectional view, respectively, showing the plan arrangement and the elevation, respectively, of the entire construction of the present apparatus. FIG. 3B is a fragmentary enlarged cross-sectional view of FIG. 3A.

Lenses 6a–6c are three lenses constituting the condenser lens system 6. Designated by 7 is the negative holding device. The negative holding device 7 includes a negative container 7a and dials 7b and 7c. The negative container 7a is supported for rotation in a plane perpendicular to the optic axis of the imaging lens. The holding device 7 is fixed to a portion 50a of an optical block bed 50. The negative 100 is movable in a one-dimensional plane perpendicular to the optic axis of the imaging lens 8 and rotatable about an axis parallel to the optic axis and by a combination of these movements, the holding device 7 can place the negative 100 at any position. By a combination of this operation and the magnification changing operation of the imaging lens system 8, it becomes possible to trim the image 10 projected onto the focal plane, as desired, thereby setting the area of the image to be scanned.

Figure 6A:
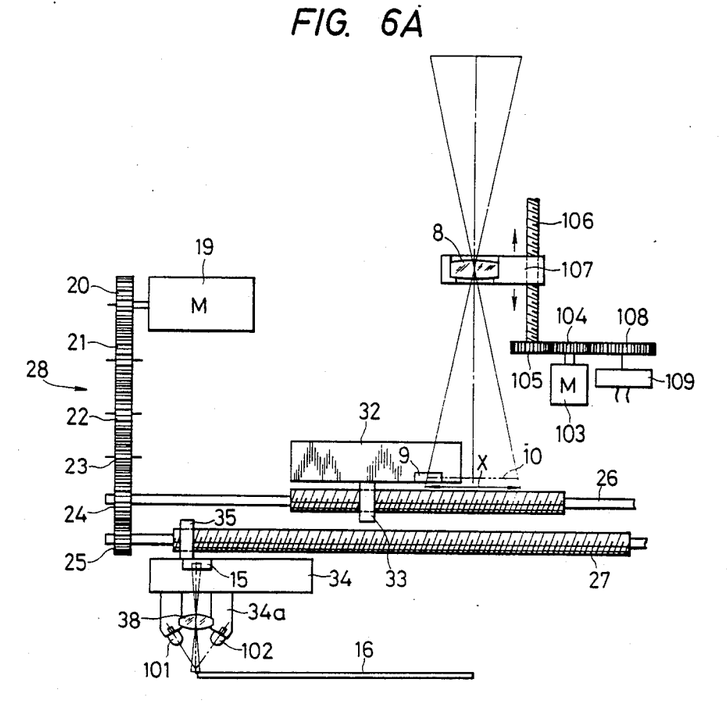
FIG. 6A shows an interlocking mechanism for two scanning systems in the embodiment.

An image scanning portion is constituted by a block 32 containing the first image sensor 9 therein, a block 34 containing the second image sensor 15 therein, members 33 and 35 having female screws fixed to the respective blocks, feed screw shafts 26 and 27 threadably mating with the female screws for feeding the blocks 32 and 34, bearings 30 and 31 of the screw shafts 26 and 27, a control motor 19, and a housing 28 containing therein the connecting gear system up to the screw shafts 26 and 27. The internal structure of the housing 28 is shown in FIG. 6A.

Shafts 36 and 37 shown in FIG. 3A are sliding movement guide shafts for the two scanning blocks 32 and 34. The reflecting mirror 11 of the observation optical system is retracted from an observation position 11a to a position 11b during the image scanning time by a mirror lifting mechanism.

FIG. 3B shows a descriptive original 16 comprising a hand-written description, an original holder 77 for holding the descriptive original 16, and the construction of an opening portion 78 provided in the original holder 77.

Reading of the descriptive original 16 is effected by fitting the original holder 77 holding the descriptive original 16 into the opening portion 60a of a housing 60 until it bears against a glass plate 39 fixed to the wall 50e of an optical block 50, and imaging the original 16 on the second one-dimensional image sensor by the imaging lens 38 through said opening portion 78. The second image sensor is contained in the scanning block 34, and is fed by the feed screw 27 to read the entire description.

Figures 4, 5:
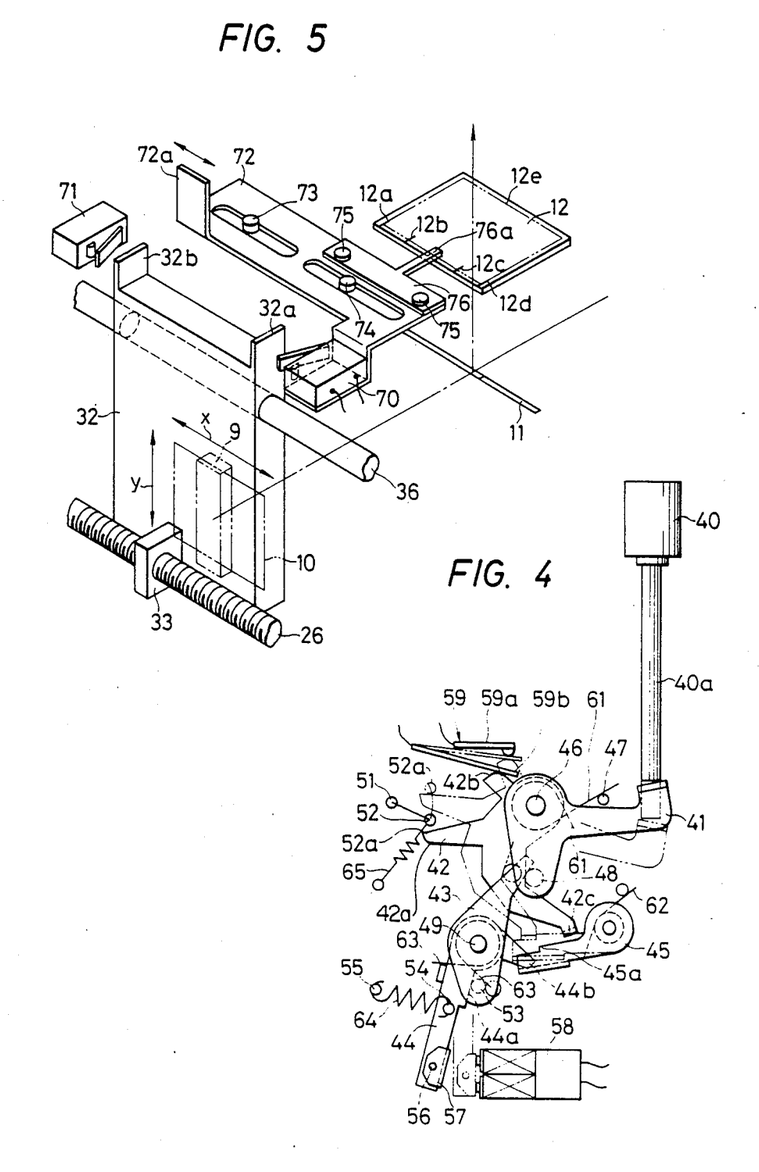
FIG. 4 shows a reflecting mirror lifting mechanism in the embodiment.
FIG. 5 shows the image scanning portion of the embodiment.

FIG. 4 shows a lifting mechanism for the reflecting mirror 11 of the observation optical system. When a push button 40 is depressed, a portion 40a thereof causes a lever 41 to pivot clockwise about a shaft 46 against the force of a spring 61. A pin 48 is secured to the lever 41, and the lever 41 causes a lever 42 to rotate in the same direction through the pin 48. One end 42a of the lever 42 is engaged with a pin 52 and rotates the pin 52 counter-clockwise about a shaft 51. The pin 52 is fixed to the support member (not shown) of the reflecting mirror 11 of the observation optical system and therefore, the mirror 11 pivots upwardly about the shaft 51. Further, when the lever 41 rotates, the pin 52 arrives at a position 52a and the mirror 11 completes its upward movement. At this time, a portion 42b of the lever 42 pushes up the contact 59b of a driving switch 59 and, as soon as the upward movement of the mirror is completed, the contacts 59a and 59b are closed and put out a driving signal indicative of the completion of the upward movement of the mirror 11 to a controlling circuit 141 which will later be described. Thereby, driving of the image sensors 9 and 15 and a motor 103 to be described is started.

The pin 48 rotates a lever 43 counter-clockwise about a shaft 49 simultaneously with the lever 42. The end surface 44a of a lever 44 and a pin 53 fixed to the lever 43 are biased by a spring 63 so as to contact each other, and this biasing force is greater than the force of a spring 64 which biases the lever 44 clockwise and therefore, when the lever 43 rotates, the lever 44 also rotates counterclockwise about a pin 49 against the force of the spring 64 and an armature 57 rotatably held by a pin 56 secured to the lever 44 comes into contact with a combination magnet 58 which effects attraction by a permanent magnet and separation by an electromagnet. At this time, a restraining lever 45 is rotated clockwise by the biasing force of a biasing spring 62 with the movement of one end 44b of the lever 44 and restrains one end 42c of the mirror-up lever 42 by means of a cutaway 45a and blocks the return of the lever 42. Thereafter, when the hand is released from the push button 40, the push button 40 and the lever 41 are returned to their initial positions by the force of the spring. When in this state the scanning of the image is completed and a terminal end detecting limit switch is closed, electric power is supplied to the combination magnet 58 and this combination magnet 58 is deenergized to permit the armature 57 to be separated therefrom, and the lever 44 is rotated clockwise by the spring 64 and one end 44b thereof rotates the restraining lever 45 counter-clockwise against the force of the spring 62, thus releasing the restraint of a lever 42c. Since the pin 52 movable with the mirror 11 is biased clockwise by a spring 65, it pushes the mirror-up lever 42 counter-clockwise and the mirror 11 is returned to a predetermined observation position.

If a signal is input also from a switch other than a limit switch 70 for detecting the termination of the scanning which will later be described and a current is supplied to the magnet 58, it will also become possible to return the mirror as required.

FIG. 5 shows a structure for monitoring the terminal end switch setting portion of the image scanning unit and the position thereof.

The imaged surface 10 of the negative is scanned by the one-dimensional image sensor 9 contained in the scanning block 32. The member 33 having a female feed screw is fixed to the scanning block 32, and the scanning block 32 is moved by rotation of the feed screw shaft 26 with the shaft 36 as the guide shaft. The block 32 is moved in the direction of arrow x and, when the upper portion 32a of this block strikes against the limit switch 70, the motor for rotating the feed screw shaft 26 is stopped and the scanning is terminated.

The limit switch 70 is fixed to a sliding plate 72 which can be slid by the operator grasping the rising portion 72a thereof to thereby set the switch 70 at any position. After having been set, the switch 70 is fixed at that position by a conventional locking device (not shown) against inadvertent movement. A display arm 76 is fixed to the sliding plate 72 by pins 75 and the projecting portion 76a thereof lies at a position corresponding to the switch 70 at 1 to 1 in the direction x and enters the optical path of the observation optical system in the vicinity of the screen 12 and thus, the position of the set terminal end switch 70 can be observed through the monitor. Index marks 12a–12d are pre-formed on the screen 12 and therefore, the observer can preset to what position the image is to be transmitted while watching the index marks 12a–12d and the portion 76a of the display arm 76 through the monitor. The limit switch 71 is a switch for stopping the returning movement of the block 32 when the scanning is completed and the block 32 has returned to its start position, and produces a signal when the upper portion 32b of the block 32 bears against the limit switch 71.

FIG. 6A shows the operative association between the image scanning system and the description scanning system.

The negative 100 has its image 10 formed by the lens 8 fixed to a lens holder 107. This image 10 is photoelectrically converted by the image scanning block 32 containing the first one-dimensional image sensor 9 therein. The block 32 is fed by the member 33 having the female feed screw and the feed screw shaft 26.

Figure 7:
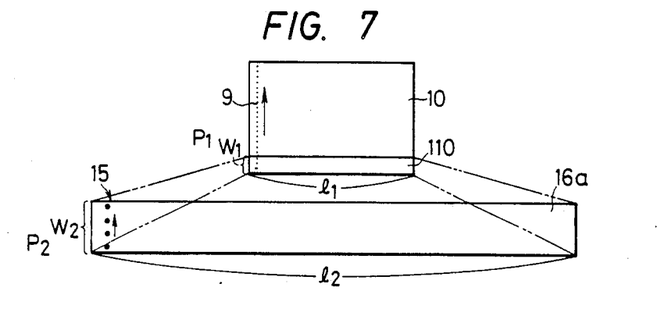
FIG. 7 illustrates the operations of the interlocking mechanisms of FIGS. 6A and 6B.

The descriptive original 16 is illuminated by illuminating members 101 and 102 and imaged on the second one-dimensional image sensor 15 contained in the description scanning block 34, by the imaging lens 38. The block 34 is fed by the member 35 having a female screw and the feed screw shaft 27. When the motor 19 revolves, it drives gears 24 and 25 fixed to the feed screw shafts 26 and 27 via gears 20–23. If the pitches, the leads and the numbers of threads of the feed screw shafts 26 and 27 are identical and the number of teeth of the gear 24 is $z_1$ and the number of teeth of the gear 25 is $z_2$, the shaft 27 will have a number of rotations determined by the ratio $z_1/z_2$ relative to the shaft 26. Accordingly, if the feed velocities of the blocks 32 and 34 are $v_1$ and $v_2$, respectively, $v_2 = v_1 \times z_1/z_2$. If, as shown in FIG. 7, correspondingly to the image sensor 9, the picture plane size of 35 mm film is adopted as the size of the image 10 of the maximum transmissible picture plane, the size 110 of the descriptive original is not a sufficient space to contain a hand-written description therein. In that case, when the descriptive original is of a size 16 and the length of the longer side of the image 10 of the negative is $l_1$ and the length of the longer side of the descriptive original size 16 is $l_2$ and if the gear ratio $z_1/z_2$ is set so that the ratio of the scanning speed of the second one-dimensional image sensor 15 to the scanning speed of the first one-dimensional image sensor 9 is $l_2/l_1$, the image readings of the two one-dimensional image sensors are effected at a predetermined time interval and as a result, an original having the length $l_2$ is reduced to the length $l_1$. Also, when the pitches between the picture elements of the two one-dimensional image sensors 9 and 15 are $P_1$ and $P_2$ and the length of the shorter side of the descriptive original size 110 is $W_1$ and the length of the shorter side of the descriptive original size 16 is $W_2$, if $P_1$ and $P_2$ are set so that $P_2 = W_2/W_1 \times P_1$, $W_2$ will be reduced to the length $W_1$. Thus, the descriptive original 16 can be electrically reduced. Actually, when the pitches $P_1$ and $P_2$ of the two one-dimensional image sensors are equal to each other, the picture elements of the sensor 15 may be used while being thinned out with $W_2/W_1$ as an integer. While the present embodiment has been described as a structure in which the descriptive original 16 is fixed and the image sensor 15 is movable in the direction x, a similar effect will of course be obtained even if the image sensor 15 is fixed and the descriptive original is made movable in the direction x. The image sensors 9 and 15 scan in the direction of the arrows as shown in FIG. 7.

Figure 6B:
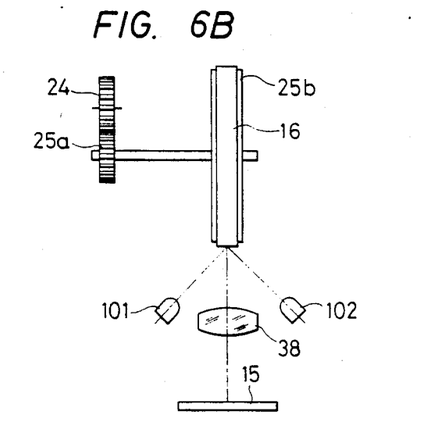
FIG. 6B shows a portion of an interlocking mechanism in which one of two scanning systems differs from the scanning systems of FIG. 6A.

FIG. 6B shows a construction in which the image sensor 15 is fixed, the original 16 is wound on a drum 25b, the drum 25b is rotated by rotation of a gear 25a having a shaft in common to the drum 25b and the image sensor 15 detects the original 16. In the other points, the construction of FIG. 6B is similar to that of FIG. 6A.

Also, if the first imaging optical system 8 is a variable magnification optical system and as shown in FIG. 6A, a lens holder 107 is moved back and forth in the direction of the optic axis by a feed screw 106 through a motor 103 connected to gears 104 and 105 to thereby effect a magnification change, the effective f-value of the imaging optical system 8 will be varied correspondingly thereto and the intensity of illumination of the negative on the imaging plane will be varied. If, to correct this, the revolution of the motor 103 is transmitted from the gear 104 to the gear 108 so that the resistance value of a potentiometer 109 directly connected to the gear 108 can be taken out as the position of the lens 8, i.e., the magnification information, for example, the charge accumulating time or the like of the image sensor can be varied by this information to correct the brightness information after the photoelectric conversion. In the present embodiment, the magnification information is imparted to the aperture controller 126 to vary the diameter of the aperture 125 of the imaging optical system 8 and correct the intensity of illumination of the image plane.

Figure 8:
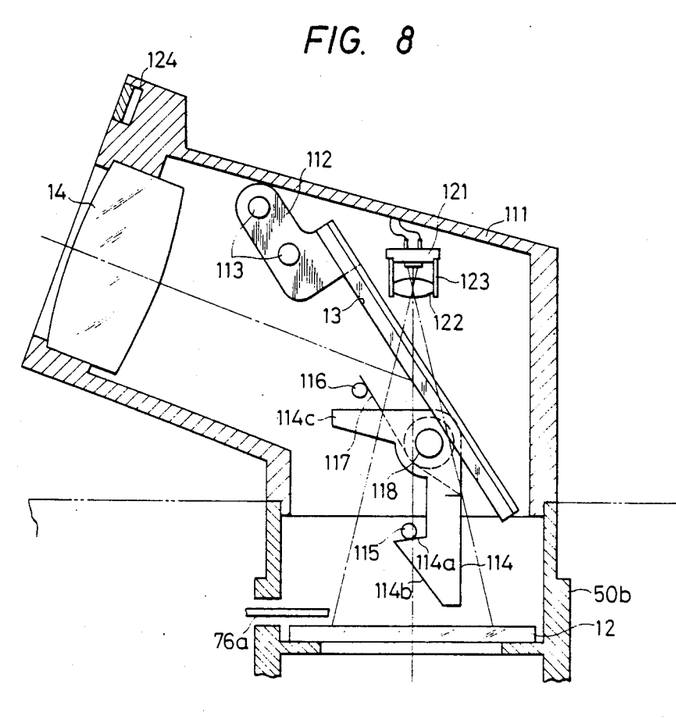
FIG. 8 is a cross-sectional view of the observation optical system of the embodiment.

FIG. 8 is a cross-sectional view of the observation optical system. A housing 111 can be removably mounted with respect to the portion 50b of the body by a removably mounting mechanism. This removably mounting mechanism is provided by the engagement of a housing fixing pin 115 provided on the wall surface of the portion 50b of the body and a removably mounting hook 114. In the state of FIG. 8, the hook 114 is biased clockwise about a shaft 118 by a spring 117 and the sloped surface 114a of the hook 114 is engaged with the fixing pin 115. A female screw is provided on the shaft 118, and the shaft 118 is fixed by a removably mounting lever and a male screw (not shown). Accordingly, the hook 114 and the removably mounting lever are rotated about the shaft 118 in operative association with each other. If the hook 114 is rotated counter-clockwise, the observation optical system can be removed from the body.

When the housing 111 is to be mounted, the hook 114 is restrained in a position in which a portion 114c thereof bears against a pin 116 and therefore, if the housing 111 is lowered, the sloped surface 114b of the hook 114 bears against the pin 115 and the hook 114 is rotated counter-clockwise and, when the housing 111 is further depressed, the hook 114 is rotated clockwise by the biasing force of a spring 117 past the vertex formed by the sloped surfaces 114b and 114a, and the sloped surface 114a comes to bear against the pin 115, thus completing the mounting. Next, if the reflecting mirror 13 in the housing 111 is a half-mirror and a photoelectric transducing element 121 is disposed on the back of the half-mirror with a barrel 123 and a lens 122, the brightness of the image on the screen 12 can be measured. If this measured value is displayed by a display device 124 such as a meter or liquid crystal, the user of the apparatus can control the quantity of light by a stop or the like and can effect photoelectric conversion always at a proper intensity of illumination irrespective of the density of the negative and thus, can minimize the irregularity of the final transmitted image. Also, the aperture controller 126 shown in FIG. 1 utilizes the measured value of the brightness to automatically vary the stop 125.

Figure 9:
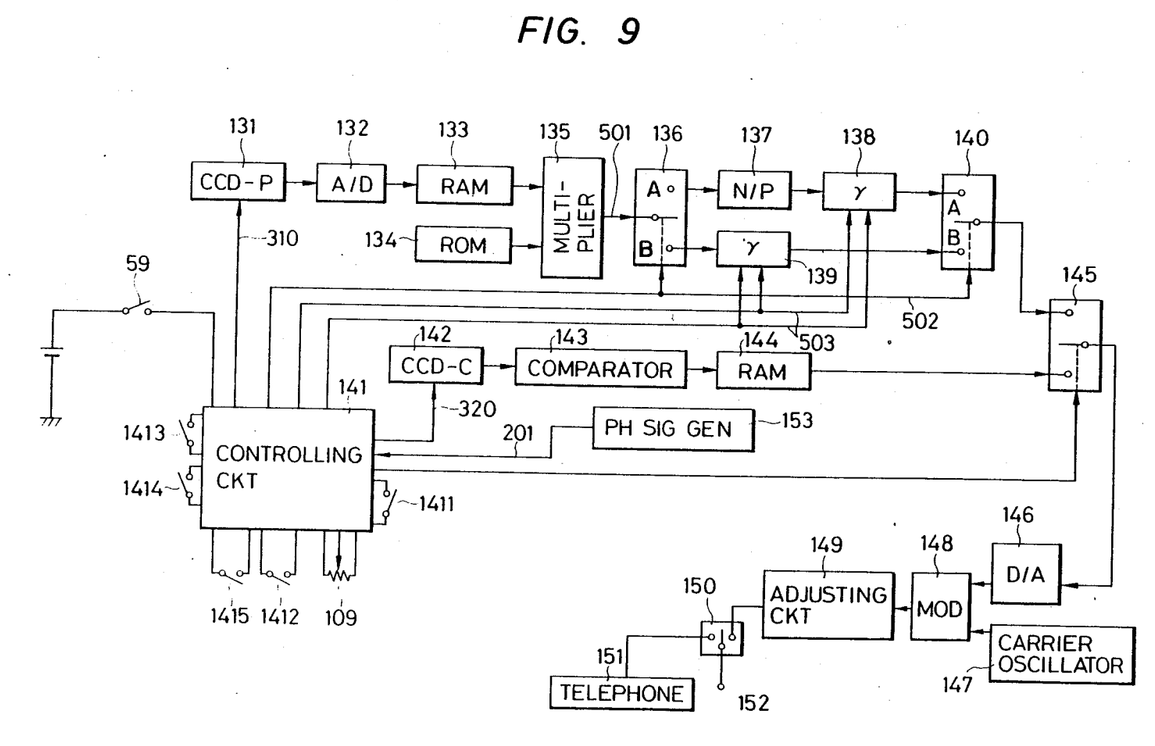
FIG. 9 is a block diagram showing the flow of the signal processing in the embodiment.

FIG. 9 is a block diagram showing the flow of the signal processing in the present phototelegraphic apparatus. CCD-P 131 designates the first one-dimensional image sensor 9 placed on the focal plane of the imaging optical system and comprising a plurality of one-dimensionally arranged charge accumulating type photoelectric transducing elements and charge coupled devices for reading the real image of the object to be photographed formed by the imaging optical system. An analog-digital converter 132 (hereinafter referred to as the A/D converter) converts the output signal read out from CCD-P 131 into a digital signal. The A/D converter 132 includes a cancelling circuit for cancelling the noise such as dark current superimposed on the output of CCD-P 131 and a variable gain amplifier for making the analog input voltage into an appropriate magnitude. A random access memory (hereinafter referred to as RAM) 133 is for temporarily storing the A/D converted digital data therein. A read only memory (hereinafter referred to as ROM) 134 has written therein a factor corresponding to the irregularity of the output of each of the charge accumulating type photoelectric transducing elements of CCD-P 131. The output of CCD-P 131 is multiplied by the factor written in ROM 134 in a multiplier 135, whereby an accurate signal can be obtained irrespective of the irregularity of the output of each photoelectric transducing element. Switches 136 and 140 are switches changed over by an external switch 1411, and in the case of the negative, they are changed over upwardly and follow the upper signal processing route. In the case of the positive, the switches 136 and 140 are changed over downwardly and follow the lower processing route. The changeover of the switches 136 and 140 is effected by a controlling circuit 141. The difference in processing between the case of the negative and the case of the positive is that in the case of the negative, the signal is input to a first γ correcting circuit 138 via a converting circuit 137. In the case of the positive, the signal is directly input to a second γ correcting circuit 139.

The second one-dimensional image sensor 142 (hereinafter referred to as CCD-C 142) for reading the descriptive original 16 corresponds to the image sensor 15 of FIGS. 2 and 3. The signal put out from CCD-C 142 is input to a comparator circuit 143 and compared with a predetermined reference value by the comparator circuit 143, which thus produces a binary output comprising a high level (hereinafter referred to as H level) or a low level (hereinafter referred to as L level) indicative of white or black. The comparator circuit 143 includes a cancelling circuit for cancelling the noise such as dark current superimposed on the output of CCD-C 142 and a variable gain amplifier for making the input voltage into an appropriate magnitude to produce a binary output.

A second RAM 144 is for temporarily storing the binary output therein.

A switch 145 is for combining the signal from CCD-P 131 and the signal from CCD-C 142. The changeover of the switch 145 is effected by the signal from the controlling circuit 141. A switch 1412 is for selecting whether a description is to be attached.

A digital-analog converter (hereinafter referred to as D/A converter) 146 converts a digital signal in which a transparent object to be photographed and the description thereof are combined into an analog signal.

A carrier oscillator 147 is for effecting the necessary modulation for delivering the image signal to a telephone circuit. Several types of carrier oscillators may be used and an optimum carrier frequency can be selected by a switch.

A modulator 148 effects the necessary modulation for electrically transmitting the image signal including a DC component through a telephone circuit. Amplitude modulation, frequency modulation or the like may be used as the modulation system.

A transmission level adjusting circuit 149 sets the peak-peak value of the signal delivered to the telephone circuit to an optimum value.

A switch 150 is for changing over the connection to the telephone circuit to a telephone 151 and an electrical transmitter. An output terminal 152 is an output terminal connected to the telephone circuit to cause the modulated image signal through the adjusting circuit 149 and the switch 150 to flow to the telephone circuit. A switch 1413 is the scanning start position limit switch 71 of CCD-P 131, and a switch 1414 is the scanning termination position limit switch 70.

A switch 1415 is a stop switch for interrupting the scanning during the scanning of CCD-P 131. A phase signal generator 153 generates a phase signal 201 to be described to the controlling circuit 141 to control the driving of CCD-P 131 and CCD-C 142.

The A/D converter 132 and RAM 133 of FIG. 9 operate as a band converting circuit. The frequency band of the subscriber's telephone circuit is several kHz, whereas the band of the signal put out from the one-dimensional image sensor is several hundred kHz to several MHz. However, if the reading-out of the one-dimensional image sensor is delayed to reduce the band, the noise by dark current or the like will be increased to narrow the dynamic range and therefore, there is a predetermined limit in reducing the band.

The multiplier 135 produces an output 501. A change-over switch 136 determines by a control signal 502 whether the output 501 is to be put out to the A side or to the B side. In the case of the negative, the changeover switch 136 is changed over to the A side and, in the case of the positive, it is changed over to the B side. Assuming a case where the object to be photographed is a negative, the signal put out from A is input to the converting circuit 137. The converting circuit 137 is a ROM which stores therein data such that the signal of the negative input to the address terminal is converted into positive. The first γ correcting circuit 138, like the converting circuit 137, comprises a ROM. In order that several kinds of γ characteristics may be selected, signals corresponding to the number of selections (in FIG. 9, there are two signals 503 and four kinds of γ characteristics can be selected by a combination thereof) may be input to the address terminal with the data. When the signal of the output 501 of the multiplier 135 is a positive, the change-over switch 136 produces the output 501 from the B side, and the output 501 is input to the second γ correcting circuit 139. The γ correcting circuit 139 also comprises a ROM in which data is written such that a signal tone-corrected relative to the signal input to the address terminal is put out.

A switch 140, like the change-over switch 36, is selected to the A side in the case of the negative, and to the B side in the case of the positive.

Figure 10A:
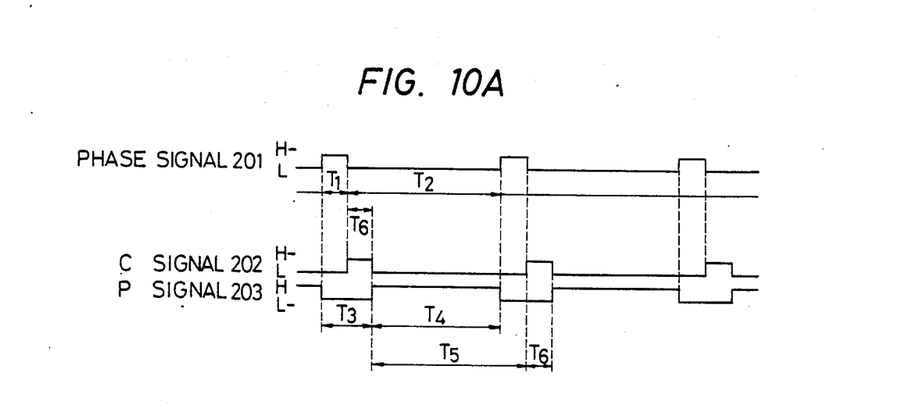
FIG. 10A is a time chart for explaining the operation of the band converting circuit of the embodiment.

FIG. 10A is a time chart for explaining the operation of the band converting circuit. A phase signal 201 generates a pulse for each scanning by the electrical transmission, thereby determining the phase of the timing of the scanning in the electrical transmission. One scanning described herein is one operation from after the charge has been shifted from the photoelectric transducing elements of CCD-P 131 and CCD-C 142 to the charge coupled devices until the reading-out of the data from RAMs 133 and 144 is terminated. Here, it is to be understood that the period $T_1$ of the H level by the pulse is the phase period.

Accordingly, when it is desired to electrically transmit only the negative, if A/D conversion of one scanning line of the output of CCD-P 131 is effected during the phase period $T_1$ and can be stored in RAM 133, the data will be slowly read out from RAM 133 during the period $T_2$ after termination of the phase period, whereby it will be possible to convert the data into a band matching the standard and electrically transmit the same. In the conventional phototelegraphic apparatus, the period of one scanning (corresponding to the number of revolutions of the drum) is of the order of 400 ms at shortest and the phase period is of the order of 20 ms. The pulse of the phase signal 201 corresponds to the blanking pulse in TV.

Also, assuming that the reading-out frequency of the one-dimensional image sensor is 1 MHz and that the number of photoelectric transducing elements of the one-dimensional image sensor is 2048, it takes about 2 ms to read out one scanning line, but since the phase period is of the order of 20 ms, it is possible to A/D-convert the output signal from the one-dimensional image sensor within the phase period and store it in the RAM.

Also, if two RAMs are provided, it will be possible to effect band conversion by alternately using these two RAMs for writing and reading-out.

The signal 202 of FIG. 10A shows a period $T_6$ of H level for one scanning period and during which the image signal corresponding to the description is read out from RAM 144, and the signal 203 of FIG. 10A shows the period which the image signal occupies, of the one scanning period of the negative to be electrically transmitted during the period $T_4$ of H level (hereinafter the signal 202 will be referred to as C signal and the signal 203 as P signal). Accordingly, when it is desired to electrically transmit the negative and the description at the same time, CCD-P 131 may be read out at the sum $T_3$ of the phase period $T_1$ and the period $T_6$ of the description and A/D conversion may be effected and stored in RAM 133, and then during the period $T_4$, the signal may be slowly read out from RAM 133 at a speed matching the standard of electrical transmission. Likewise, CCD-C 142 and comparator 143 may convert the signal into a binary output during the phase period $T_1$ and the period $T_5$ and may store it in RAM 144, and then may slowly read it out from RAM 144 during the period $T_6$. The aforementioned C signal 202 and P signal 203 are generated by the controlling circuit 141, and the C signal 202 is input to RAM 144 and the P signal 203 is input to RAM 133.

The speeds at which the signals of CCD-P 131 and CCD-C 142 are read out need not be the same, but if, of one scanning period, the period which the signal of the negative occupies is longer than the period which the description occupies, CCD-C 142, as compared with CCD-P 131, may slowly read out. CCD-C 142 which reads the description deals with the image indicated by a binary signal of white or black and therefore, as compared with CCD-P 131, it is strong for the reduction in dynamic range caused by an increase in dark current and suffers less from a problem even if it slowly reads out.

Figure 10B:
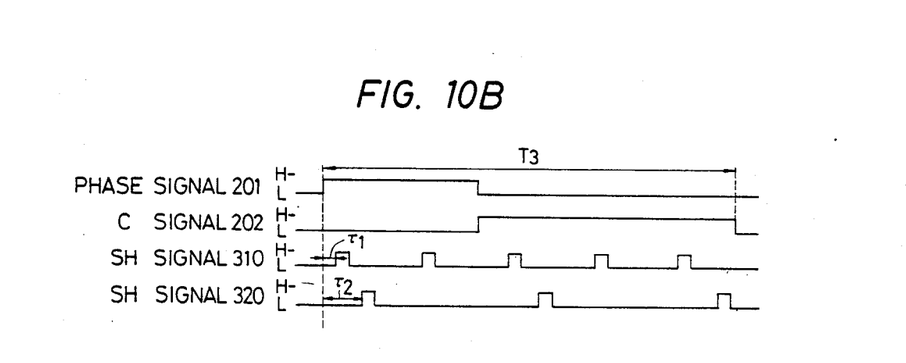
FIG. 10B is a time chart showing the driving of the image sensor of the embodiment.

FIG. 10B shows the phase signal 201 and the C signal 202 on an enlarged scale, and illustrates the relation among these signals, one SH signal 310 of the driving signals of CCD-P 131 and one SH signal 320 of the driving signals of CCD-C 142. The SH signals, in the one-dimensional image sensor having charge coupled devices, are shift signals for shifting the charge produced in the charge accumulating type photoelectric transducing elements of the light-receiving portion to the charge coupled devices which are the transfer portion, and also are signals for starting the reading-out of the charge and are generated by the controlling circuit 144. To effect band conversion, the period of the SH signal 310 must be shorter than the period $T_3$. Likewise, the period of one SH signal 320 of the signals for driving CCD-C 142 must also be shorter than the period $T_5$, and it is necessary to make $\tau_2$ constant relative to the phase signal 201.

Figure 11A:
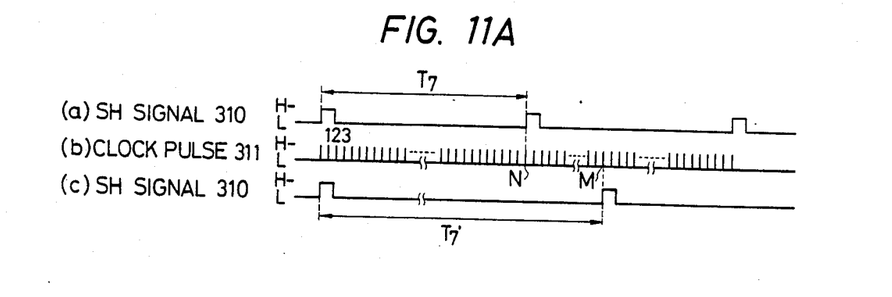
FIG. 11A is a time chart of the circuit of FIG. 11B.
Figure 11B:
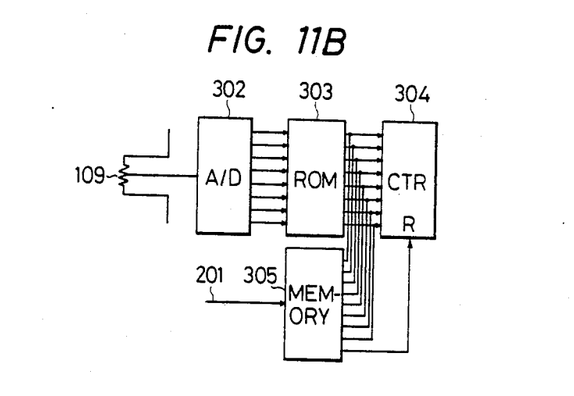
FIG. 11B shows a circuit for correcting any variation in effective F-value of the imaging optical system resulting from zooming.

FIGS. 11A and 11B show a circuit for correcting any variation in effective F-value resulting from the zooming of the optical system for causing the negative to be electrically transmitted to be imaged on CCD-P 131 and a time chart, respectively. With the zooming of the imaging optical system, the effective F-value is varied and therefore, the intensity of illumination of the formed image is varied. This can be corrected by varying the exposure time of CCD-P 131.

In FIG. 11A, the new charge accumulation by CCD-P 131 and CCD-C 142 is started by SH signal 310. Accordingly, as shown in FIG. 11A(a), the exposure time can be varied by varying the pulse interval $T_7$ of SH signal 310. When the effective F-value of the imaging optical system 8 is varied and for example, the F-value becomes greater, the intensity of illumination of the image becomes lower and therefore, the pulse interval of SH signal 310 may be made longer by an amount corresponding to the decrease in intensity of illumination to thereby make the exposure time longer, and the pulse interval of SH signal 310 may be made shorter by an amount corresponding to the increase in intensity of illumination which results from a decrease in F-value to thereby make the exposure time shorter. If, to realize this, it is desired to make the interval of SH signal as long as N clock pulses 311 shown in FIG. 11A(b), SH signal 310 may be produced for N clock pulses each by a counter for counting N clock pulses. In FIG. 11B, a potentiometer 109 substitutes a variation in resistance value for magnification information, and further converts it into a voltage and applies the same to an A/D converter 302. The magnification information converted into a digital value by the A/D converter 302 is input to ROM 303. The output of ROM 303 is input to a counter circuit 304. The counter circuit 304 counts as many clock pulses as indicated by the input data, that is, counts M clock pulses if data M are input, and converts the interval of SH signal into $T_7$, as shown by the SH signal 310 of FIG. 11A(c). Accordingly, if such a content that the value to be counted for the magnification information which is the input data can be put out is given in advance as the content of ROM, any variation in effective F-value resulting from a variation in magnification can be corrected.

However, as shown in FIG. 10(B), $\tau_1$ in SH signal 310 must be constant. Accordingly, the counter 304 must be reset in response to the rising of the phase signal 201, and instead of the data from ROM 303, a data indicative of the number of pulses of a clock signal 311 corresponding to $\tau_1$ must be given to the counter 304. It is a memory circuit 305 that performs this function. The memory circuit 305 stops the generation of the data to the counter 304 in response to the completion of the counting of the counter 304. Accordingly, from thereafter till the rising of the phase signal 201, the counter 304 effects counting on the basis of the data from ROM 303.

The operation of the embodiment will now be described. The negative 100 is received into the container. The trimming is determined by the rotation of the container 7a about the optic axis, the movement thereof by the dials 7b and 7c in a plane perpendicular to the optic axis, and the zooming by the imaging optical system 8. This operation is effected while the operator observes through the observation optical system 11 to 14. The description is hand-written on paper or the like and, as shown in FIG. 3B, the paper is held by the original holder 77 and fitted into the opening portion 60a of the housing 60. This completes the preparation for transmission, but as in the conventional phototelegraphic system, prior to the transmission, the telephone circuits on the reception side and the transmission side are connected together, the phase signal 201 of the transmitting apparatus is modulated and transmitted, the receiving apparatus is synchronized with this phase signal, and thereafter a white signal is transmitted to set the amplification level of the receiving apparatus. After the preparation for transmission has been completed, the push button 40 of FIG. 4 is depressed to retract the reflecting mirror 11 of the observation optical system from the optical path and the image of the negative 100 is picked up by the first image sensor 9 (CCD-P 101) while the image of the descriptive original 16 is scanned by the second image sensor 15. When the reflecting mirror 11 is completely retracted, the switch 59 of FIG. 4 is closed and in response thereto, the controlling circuit 141 revolves the motor 19 of FIG. 6A to start the scanning of CCD-P 131 and CCD-C 142. Termination of the scanning is accomplished by the signal from the limit switch 70 of FIG. 5 being input to the controlling circuit 141. That is, when the limit switch 70 is closed, the scanning is terminated and the first image sensor 9 (CCD-P 131) and the second image sensor 15 (CCD-C 142) return to the scanning start position. At the same time, a signal is supplied from the controlling circuit 141 to the combination magnet 58 to separate the armature 57 therefrom and return the mirror 11 to its initial position. The scanning start position is determined by the limit switch 71 of FIG. 5.

By the switch 59 being closed, the motor 19 and the electric circuit shown in FIG. 9 start to operate. First, the phase signal generator 153 generates a phase signal, and the motor 19 revolves in synchronism with the phase signal to move CCD-P 131 (in FIG. 6A, it corresponds to the image sensor 9) and CCD-C 142 (in FIG. 6A, it corresponds to the image sensor 15) as shown in FIG. 6A. CCD-P 131 and CCD-C 142 shift the charge produced in the light-receiving portion to the transfer portion in response to SH signals 310 and 320, respectively, and an analog output signal is produced from the transfer portion in response to the clock pulse. The analog signal from CCD-P 131 is converted into a digital signal and written into RAM 133. The comparator 143 converts the analog signal from CCD-C 142 into a binary output and writes it into RAM 144. The signal written into RAM 144 is read out by the controlling circuit 141 at a band matching the electrical transmission for a period during which the C signal is at H level, and is electrically transmitted through the switch 145, the D/A converter 146, the modulator 148 and the adjusting circuit 149. After the data of RAM 144 has been electrically transmitted, the data written into RAM 133 is read out by the controlling circuit 141 at a band matching the electrical transmission for a period during which the P signal is at H level, and is multiplied by the factor written into ROM 134, by the multiplier 135, and is corrected in accordance with the sensitivity of each photoelectric transducing element of CCD-P 131. The output from the multiplier 135, in the case of the negative, is input to the $\gamma$ correcting circuit 138 through the switch 136 and the converting circuit 137 and, in the case of the positive, is input to the $\gamma$ correcting circuit 139. The switch 140 selects the output signal of one of the $\gamma$ correcting circuits 138 and 139, and the selected signal is electrically transmitted through the D/A converter 146, the modulator 148 and the adjusting circuit 149.

Figure 12:
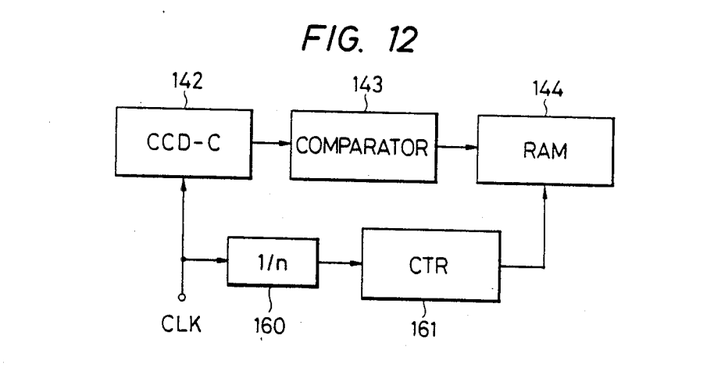
FIG. 12 is a block diagram showing an electric circuit partly different from the circuit of FIG. 11.

In the CCD-C 142 of FIG. 9, the intervals between the one-dimensionally arranged photoelectric transducing elements are wider than the intervals between the photoelectric transducing elements of CCD-P 131. In the description corresponding to FIGS. 6A and 7, it has been mentioned that where the intervals between the photoelectric transducing elements of the two image sensors are equal, a part of the output from the photoelectric transducing elements of the image sensor which scans the description may be selected. FIG. 12 shows a block diagram of an electric circuit for executing the above-described operation. In FIG. 12, CCD-C 142, comparator 143 and RAM 144 are similar to those shown in FIG. 9, and the other circuits are omitted. The difference of the FIG. 12 circuit from the FIG. 9 circuit is that there are a frequency divider 160 for frequency-dividing the clock pulse CLK which is the driving signal of CCD-D 142 into 1/n and a counter 161 for counting the pulses frequency-divided by the frequency divider 160 and indicating the address to RAM 144. The frequency divider 160 generates a pulse each time n pulses of the clock pulse CLK are generated. The counter 161 counts the pulses from the frequency divider 160 and inputs a signal indicative of the counted value as an address signal to RAM 144. Accordingly, RAM 144 stores therein only the output signals from n-1 photoelectric transducing elements of the one-dimensionally arranged photoelectric transducing elements of CCD-C 142.

We claim:

1. An apparatus for electrically transmitting through a telephone circuit the image of a pattern corresponding to the light transmission characteristic of a light-transmitting film substrate, said apparatus including:
   (a) means for illuminating said film substrate;
   (b) means for holding said film substrate;
   (c) an optical system for causing the image of said pattern by the light from said illuminating means transmitted through said film substrate to be formed on a predetermined plane;
   (d) means for disposing said illuminating means rearwardly of said film substrate relative to said optical system;
   (e) photoelectric transducing means including an image sensor having a light-receiving surface for receiving the light from said illuminating means transmitted through said film substrate, said light-receiving surface being arranged at a position substantially coincident with said predetermined plane in the direction of the optical axis of said optical system, said photoelectric transducing means producing an output signal corresponding to the distribution of intensity of light on said light-receiving surface;
   (f) means for changing the magnification of said optical system;
   (g) means for detecting the magnification of said optical system and producing a detection signal;
   (h) control means for causing said output signal to be independent of the magnification of said optical system in accordance with said detection signal; and
   (i) means for transmitting said output signal to said telephone circuit.

2. An apparatus according to claim 1, wherein said optical system includes an aperture and said control means includes means for controlling said aperture in accordance with said detection signal.

3. An apparatus according to claim 1, wherein said image sensor includes a plurality of charge accumulating type photoelectric transducing elements and said control means includes means for controlling the charge accumulating time of said plurality of charge accumulating type photoelectric transducing elements.

4. An apparatus according to claim 1, wherein said image sensor is a linear image sensor and said photoelectric transducing means includes displacing means for imparting relative displacement between said light-receiving surface and the image of said pattern in a direction orthogonal to the optical axis of said optical system.

5. An apparatus for electrically transmitting through a telephone circuit the image of a pattern corresponding to the light transmission characteristic of a light-transmitting film substrate, said apparatus including:
   (a) means for illuminating said film substrate;
   (b) means for holding said film substrate;
   (c) a first optical system for causing the image of said pattern by the light from said illuminating means transmitted through said film substrate to be formed on a predetermined plane;
   (d) means for disposing said illuminating means rearwardly of said film substrate relative to said first optical system;
   (e) photoelectric transducing means including a linear image sensor having a light-receiving surface extending in one direction for receiving the light from said illuminating means transmitted through said film substrate, said light-receiving surface being arranged at a position substantially coincident with said predetermined plane in the direction of the optical axis of said first optical system, said photoelectric transducing means producing an output signal corresponding to the distribution of intensity of light on said light-receiving surface;
   (f) a second optical system having an optical member which has a first state and a second state, said optical member directing at least part of the light from said first optical system to said second optical system when said optical member is in said first state but not when said optical member is in said second state, and said second optical system cuasing an image of said pattern by said at least part of the light from said first optical system to be formed on an observation plane disposed at a position optically equivalent to said predetermined plane;
   (g) means for changing said optical member from said first state to said second state;
   (h) displacing means responsive to the change of said optical member from said first state to said second state to impart relative displacement between said light-receiving surface and the image of said pattern thereon in a direction orthogonal to the optical axis of said first optical system, said photoelectric transducing means starting to produce said output signal in response to the change of said optical member from said first state to said second state; and
   (i) means for transmitting said output signal to said telephone circuit.

6. An apparatus according to claim 5 which further comprises means for detecting the intensity of at least part of the light directed by said optical member and for producing an output corresponding to said intensity.

7. An apparatus according to claim 6, wherein said first optical system includes aperture means and said apparatus further comprises means for controlling said aperture means in accordance with said photometric output.

8. An apparatus for electrically transmitting through a telephone circuit the image of a pattern corresponding to the light transmission characteristic of a light-transmitting film substrate and the image of a document, said apparatus including:
   (a) means for illuminating said film substrate;
   (b) means for holding said film substrate;
   (c) a first optical system for causing the image of said pattern by the light from said illuminating means transmitted through said film substrate to be formed on a first predetermined plane;
   (d) means for disposing said illuminating means rearwardly of said film substrate relative to said first optical system;
   (e) first photoelectric transducing means including a first linear image sensor having a light-receiving surface extending in one direction for receiving the light from said illuminating means transmitted through said film substrate, said first photoelectric transducing means producing a first light intensity signal corresponding to the distribution of intensity of light on said light-receiving surface, said light-receiving surface being arranged at position substantially coincident with said first predetermined plane in the direction of the optical axis of said first optical system;

(f) means for holding said document;

(g) a second optical system for causing the image of said document to be formed on a second predetermined plane;

(h) second photoelectric transducing means including a linear image sensor having a light-receiving surface substantially coincident with said second predetermined plane in the direction of the optical axis of said second optical system;

(i) first displacing means for imparting relative displacement between the light-receiving surface of said first linear image sensor and the image of said pattern in a direction orthogonal to the optical axis of said first optical system; and (j) second displacing means responsive to said first displacing means for imparting relative displacement between the light-receiving surface of said second linear sensor and the image of said document in a direction orthogonal to the optical axis of said second optical system.

9. An apparatus according to claim 8, wherein the velocity of the displacement of said second displacing means is faster than the velocity of the displacement of said first displacing means.

10. An apparatus according to claim 8, wherein said second displacing means includes a drum member on which said document is wound, and means for rotating said drum member around an axis orthogonal to the optical axis of said second optical system.

11. An apparatus according to claim 8, wherein said second photoelectric transducing means produces a second light intensity signal corresponding to the distribution of intensity of light on said light-receiving surface of said second linear sensor.

12. An apparatus according to claim 11 which further comprises transmitting means for transmitting said first and second light intensity signals to said telephone circuit.

13. An apparatus according to claim 12, wherein said transmitting means has a first period of time and a second period of time, and wherein said transmitting means transmits said first light intensity signal to said telephone circuit in said first period of time and transmits said second light intensity signal to said telephone in said second period of time.

14. An apparatus according to claim 13, wherein said transmitting means includes means for changing said first period of time and said second period of time alternately.

15. An apparatus according to claim 13, wherein said transmitting means includes means for transmitting said first light intensity signal to said telephone circuit in said second period of time and means for inhibiting said transmitting means from transmitting said second light intensity signal to said telephone circuit in said second period of time.

16. An apparatus for electrically transmitting through a telephone circuit the image of a pattern corresponding to the light transmission characteristic of a light-transmitting film substrate, said apparatus including:

(a) means for illuminating said film substrate;

(b) a holding member for holding said film substrate;

(c) an optical system for causing the image of said pattern by the light from said illuminating means transmitted through said film substrate to be formed on a predetermined plane;

(d) means for disposing said illuminating means rearwardly of said film substrate relative to said optical system;

(e) photoelectric transducing means including a linear image sensor having a light-receiving surface extending in one direction for receiving the light from said illuminating means transmitted through said film substrate, said light-receiving surface being arranged at a position substantially coincident with said predetermined plane iin the direction of the optical axis of said optical system, said photoelectric transducing means producing an output signal corresponding to the distribution of intensity of light on said light-receiving surface;

(f) scan means for scanning the image of said pattern by said linear image sensor; and (g) setting means for setting the area of the image of said pattern scanned by said linear image sensor.

17. An apparatus according to claim 16 which further comprises means responsive to said setting means to indicate the area set by said setting means.

18. An apparatus according to claim 16, wherein said scan means includes means for moving said linear image sensor in a direction orthogonal to the optical axis of said optical system.

19. An apparatus according to claim 16, wherein said setting means includes means for changing the magnification of said optical system and means for moving said holding member in a direction orthogonal to the optical axis of said optical system.

20. An apparatus for electrically transmitting through a telephone circuit the image of a pattern corresponding to the light transmission characteristic of a light-transmitting film substrate, said apparatus including:

(a) means for illuminating said film substrate;

(b) means for holding said film substrate;

(c) an optical system for causing the image of said pattern by the light from said illuminating means transmitted through said film substrate to be formed on a predetermined plane;

(d) means for disposing said illuminating means rearwardly of said film substrate relative to said optical system;

(e) photoelectric transducing means including an image sensor having a light-receiving surface for receiving the light from said illuminating means transmitted through said film substrate, said light-receiving surface being arranged at a position substantially coincident with said predetermined plane in the direction of the optical axis of said optical system, said photoelectric transducing means producing an output signal corresponding to the distribution of intensity of light on said light-receiving surface, the frequency band of said output signal being higher than the frequency band of said telephone circuit; and (f) transmitting means having band converting means for reducing the frequency band of said output signal, said transmitting means transmitting said output signal to said telephone circuit, and said band converting means including conversion means for converting an analog signal into a digital signal and means for storing said digital signal.

21. An apparatus according to claim 20, wherein said transmitting means includes means for correcting the γ value of said output signal.

22. An apparatus according to claim 20, wherein said transmitting means includes means permitting said output signal to be converted so that the distribution of intensity of light indicated by the converted output signal is the inverse of the distribution of intensity of light indicated by said output signal.

23. An apparatus for electrically transmitting through a telephone circuit the image of a pattern corresponding to the light transmission characteristic of a light-transmitting film substrate, said apparatus including:
(a) means for illuminating said film substrate;
(b) means for holding said film substrate;
(c) an optical system for causing the image of said pattern by the light from said illuminating means transmitted through said film substrate to be formed on a predetermined plane;
(d) means for disposing said illuminating means rearwardly of said film substrate relative to said optical system;
(e) photoelectric transducing means including an image sensor having a light-receiving surface for receiving the light from said illuminating means transmitted through said film substrate and including a plurality of photoelectric transducing elements, said light-receiving surface being arranged at a position substantially coincident with said predetermined plane in the direction of the optical axis of said optical system, said photoelectric transducing means producing an output signal corresponding to the distribution of intensity of light on said light-receiving surface, the frequency band of said output signal being higher than the frequency band of said telephone circuit; and
(f) transmitting means having band converting means for reducing the frequency band of said output signal, said transmitting means transmitting said output signal to said telephone circuit, said transmitting means including means for correcting said output signal in accordance with the character of the output of each of said elements.

24. An apparatus for electrically transmitting through a telephone circuit the image of a pattern corresponding to the light transmission characteristic of a light-transmitting film substrate, said apparatus including:
(a) means for illuminating said film substrate;
(b) means for holding said film substrate;
(c) an optical system for causing the image of said pattern by the light from said illuminating means transmitted through said film substrate to be formed on a predetermined plane;
(d) means for disposing said illuminating means rearwardly of said film substrate relative to said optical system;
(e) photoelectric transducing means including an image sensor having a light-receiving surface for receiving the light from said illuminating means transmitted through said film substrate and including a plurality of photoelectric transducing elements, said light-receiving surface being arranged at a position substantially coincident with said predetermined plane in the direction of the optical axis of said optical system, said photoelectric transducing means producing an output signal corresponding to the distribution of intensity of light on said light-receiving surface, the frequency band of said output signal being higher than the frequency band of said telephone circuit; and
(f) transmitting means having band converting means for reducing the frequency band of said output signal, said transmitting means transmitting said output signal to said telephone circuit, said transmitting means including means for correcting said output signal in accordance with the character of the output of each of said elements and said correcting means including means for memorizing a factor corresponding to the character of the output of each of said elements and means for multiplying said output signal by said factor.

25. An apparatus for electrically transmitting through a telephone circuit the image of a pattern corresponding to the light transmission characteristic of a light-transmitting film substrate, said apparatus including:
(a) means for illuminating said film substrate;
(b) means for holding said film substrate;
(c) an optical system for causing the image of said pattern by the light from said illuminating means transmitted through said film substrate to be formed on a predetermined plane;
(d) means for disposing said illuminating means rearwardly of said film substrate relative to said optical system;
(e) photoelectric transducing means including an image sensor having a light-receiving surface for receiving the light from said illuminating means transmitted through said film substrate, said image sensor being a linear image sensor, said photoelectric transducing means including displacing means for imparting relative displacement between said light-receiving surface and the image of said pattern in a direction orthogonal to the optical axis of said optical system, said light-receiving surface being arranged at a position substantially coincident with said predetermined plane in the direction of the optical axis of said optical system, said photoelectric transducing means producing an output signal corresponding to the distribution of intensity of light on said light-receiving surface, the frequency band of said output signal being higher than the frequency band of said telephone circuit; and
(f) transmitting means having band converting means for reducing the frequency band of said output signal, said transmitting means transmitting said output signal to said telephone circuit.

* * * * *